April 30, 1968 D. E. LOOD ETAL 3,380,156

METHOD OF FABRICATING THIN FILM RESISTORS

Filed Nov. 15, 1965

Douglas E. Lood,
Rueben S. Spriggs,
John L. Rogers,
INVENTORS.
BY.
Jerry A. Dinardo
AGENT.

United States Patent Office 3,380,156

Patented Apr. 30, 1968

3,380,156

METHOD OF FABRICATING THIN FILM RESISTORS

Douglas E. Lood, Rodondo Beach, Rueben S. Spriggs, San Pedro, and John L. Rogers, Hermosa Beach, Calif., assignors to TRW Inc., Redondo Beach, Calif., a corporation of Ohio Filed Nov. 15, 1965, Ser. No. 507,956

11 Claims. (Cl. 29—620)

This invention relates to the art of fabricating thin films, and more particularly to improvements in forming thin resistive films of high sheet resistance.

In copending application of Rueben S. Spriggs et al., Ser. No. 368,811, filed May 20, 1965, entitled, "Method of Forming Mesh-Like Structure and Article Produced Thereby," there is disclosed a method of fabricating thin film resistors of high sheet resistance. According to the method disclosed therein, an agglomerated film made up of tiny islands of a first metal, is vacuum deposited on a substrate. A second metal film is vacuum deposited over the first agglomerated film so as to fill in the voids between the islands of the first metal film, while leaving the sides of the islands uncoated. The composite film structure is treated with a chemical etchant that dissolves the first metal film but leaves the second film intact. When the first metal film islands are removed, the second film structure that remains is a mesh or net of high electrical resistance.

An object of this invention is to provide a simplified method of fabricating an electrically resistive structure.

A further object is to provide an improved method of forming thin films of high sheet resistance.

An additional object is to provide a method of fabricating thin film resistors whose sheet resistance can be measured electrically during their fabrication.

Yet another object is to provide thin film resistors having improved stability at elevated temperatures.

The foregoing and other objects are achieved in accordance with the method of the invention by depositing a first film made up of closely spaced agglomerates or islands of an oxidizable metal. These metal islands, which are normally electrically conductive, are then oxidized to form an insulating layer over the exposed surface. A second film of resistive material is deposited in the voids between the islands of the first film. The second film forms an electrically conductive network of high sheet resistance, the strands of which are insulated from each other by the insulative islands. Since the islands are insulative in themselves, they need not be removed, thereby simplifying the method of fabricating the network. In addition, since the islands are insulated from the network, the resistance of the network can be measured during deposition to produce a network of desired resistance value.

Figure 1:
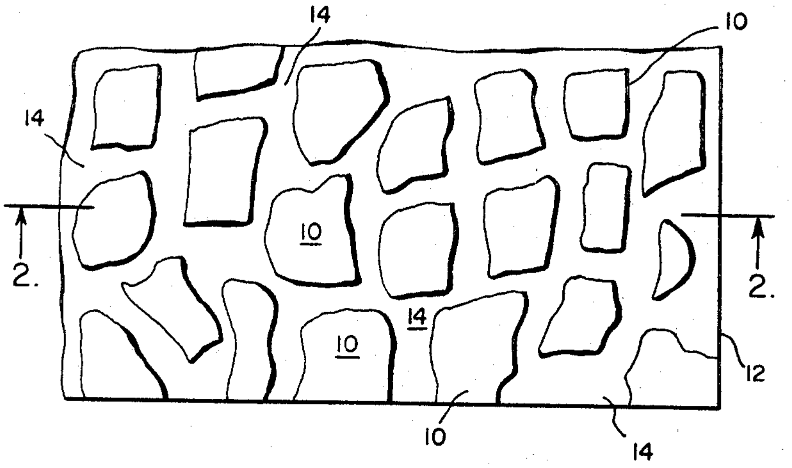
FIGURE 1 is a partial plan view, greatly enlarged, of a film structure shown during one phase of the method according to the invention.
Figure 2:
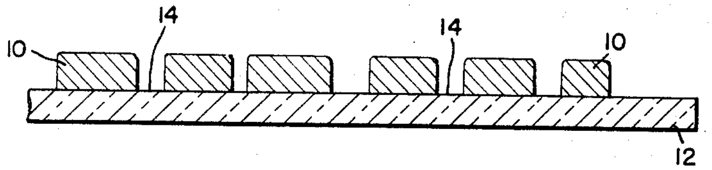
FIGURE 2 is an idealized sectional view, taken along line 2—2 of FIGURE 1.

Referring to FIGURES 1 and 2, a method of forming a thin mesh-like film according to the invention comprises vacuum depositing a film 10 of a first metal onto a substrate 12 to a thickness such that the first film 10 is in the form of many tiny islands, with interconnecting voids 14 or bare areas remaining on the substrate 12 between the islands. The film 10 is deposited at a pressure less than $10^{-6}$ torr. Quartz glass, oxidized silicon, or any other material on which the first film 10 agglomerates, may be used for the substrate 12. The thickness of the first film 10 may be between a few hundred angstroms and a few microns.

The metal used for the first film 10 is one that is easily oxidized. Aluminum or lead are preferred for the first metal since they will provide a sufficiently gross structure to form the necessary agglomerates or islands, and they can be oxidized thermally. Lead will form the desired metal islands at room temperature. Aluminum, on the other hand, tends to form continuous films at thicknesses less than 100 angstroms, when the substrate is maintained at room temperature. However, agglomerated aluminum films in accordance with the invention may be formed by maintaining the substrate at elevated temperatures such as 400 to 500° C.

Whether made by depositing lead at room temperature, or aluminum at elevated temperatures, the first film 10 is preferably deposited to a thickness of between a few hundred angstroms and a few microns, depending upon the deposition rate. Suitable vapor deposition apparatus for depositing the films of the invention is disclosed in U.S. Patent 3,177,025. Preferably the thickness of the first film 10 may be controlled by determining that thickness of a sample film at which electrical continuity first ensues, for a given deposition rate. Then, using the same deposition rate, the deposition for the actual film 10 may be carried on for a fractional part of the time required for the sample film to first become electrically conductive.

Figure 3:
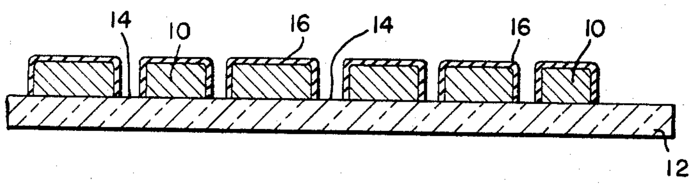
FIGURE 3 is an idealized sectional view, greatly enlarged, showing a film structure during a later phase of the method of the invention.

After the first film 10 is deposited, oxygen or air may be admitted into the vacuum system and the substrate 12 heated to about 200° C. to form a metal oxide coating 16 on the film 10, as shown in FIGURE 3. The metal oxide coating 16 is either of lead oxide or aluminum oxide depending upon the metal used for the first film 10. The air or oxygen may be admitted to a partial pressure of a few microns. The oxide coating 16 is electrically insulative. After the oxide coating 16 is formed, the high vacuum may be restored by pumping out the air or oxygen.

Figure 4:
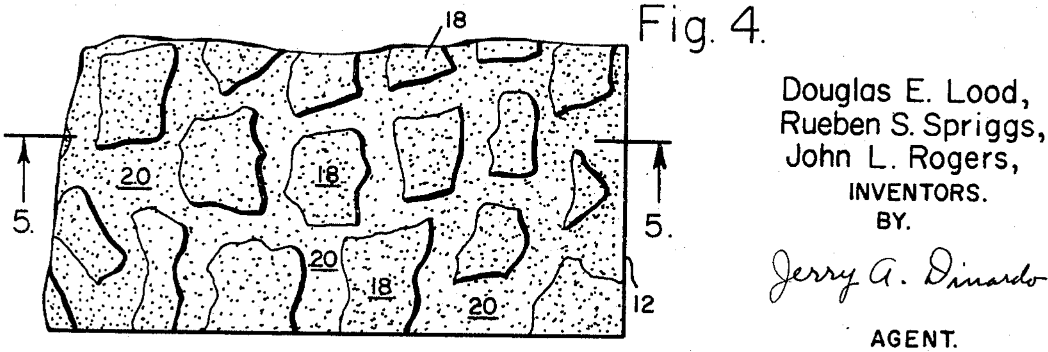
FIGURE 4 is a partial plan view, greatly enlarged, showing a film structure during the last phase of the method of the invention.

Referring now to FIGURE 4, a second material is vapor deposited over the first film 10 and the oxide coating 16. The second film material has isolated areas 18 which coat portions only of the oxide coated islands of the first film 10 and continuous portions 20 which cover the bare areas of the substrate 12 so as to fill in the voids 14 to a depth appreciably less than the thickness of the first film 10. The thickness of the second film may be of the order of a few hundred angstroms. Preferably, the second film is deposited while the substrate is held at an elevated temperature, to insure stability and enhance adhesion to the substrate. The substrate temperature is limited by the melting point of the metal of the first film 10. In the case of lead, the maximum substrate temperature is about 300° C., whereas for aluminum, a higher substrate temperature, such as 500° C., may be used.

When the cross-section of the agglomerates comprising the first film 10 is that shown, the second film will generally have the thickness distribution shown. This occurs because the thickness of film material deposited in proportional to the cosine of the angle between the direction of the incident vapor and the normal to the surface on which the vapor impinges. Thus, when vapor is directed substantially normal to the substrate surface, the steep side portions 22 of the oxide coated first film 10 will remain substantially free from the second film material. The thickness of the second film on the portions 22 will be less than the thickness required for electrical conduction.

Figure 5:
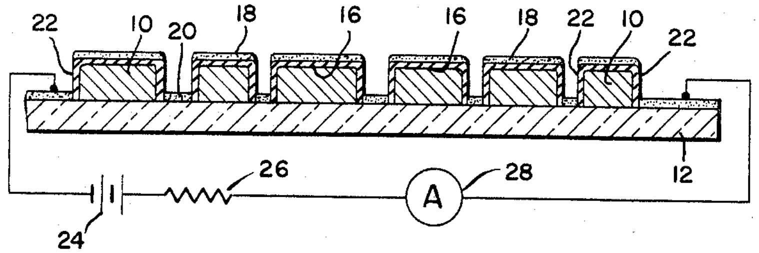
FIGURE 5 is an idealized sectional view taken along line 5—5 of FIGURE 4.

The continuous portions 20 of the second film form a network, shown more clearly in FIGURE 5, on the substrate 12, that is isolated from the isolated portions 18 by the spacing there between, and also isolated from the film 10 by the insulative oxide coating 16. Thus, there is no need to remove the islands of the first film 10 to prevent interaction there between, as is done in the prior art.

The sheet resistance of the second film or network 20 may be continuously monitored during deposition by measuring the current drawn by the network 20. For example, a voltage supply 24 may be used to send a measuring current in series with the network 20, a protective resistor 26, and an ammeter 28, as shown in FIGURE 4.

Preferred materials for the second film are chromium or cermet, which is a mixture of chromium and silicon monoxide. Other electrically conductive material may be used for the second film, provided that the material selected be one that will adhere well to the substrate, and be electrically stable in very thin films of a few hundred angstroms in thickness.

One apparent advantage of the method of the invention is that the entire deposition process can be performed in a vacuum system, inasmuch as there is no need to remove the first film 10. In addition, the sheet resistance of the network can be monitored electrically during the deposition until the desired value is reached.

A further advantage of using for the first film 10, a metal of reasonably high melting point such as aluminum and oxidizing the same, is that a high substrate temperature can be maintained during the deposition of the resistive film. High substrate temperatures such as 500° C. are necessary, in some applications, to stabilze the resistive network at temperatures to which it may be subjected during subsequent manufacturing processes and during actual circuit operation. The maximum substrate temperature is limited by the melting point of the metal of the first film 10. If the melting temperature is exceeded, the metal islands will coalesce to form a continuous film. Therefore, where stabilization of the resistive film 18 is necessary, such as thin film resistors in a silicon integrated circuit, a high melting point metal such as aluminum should be used for the first film 10.

The embodiments of the invention in which an exclusive property or privilege is claimed are defined as follows:

1. A method of fabricating an electrically resistive mesh film, comprising:

producing a multiplicity of closely spaced unconnected islands of oxidizable metal on an electrically insulative substrate;

oxidizing the top and side surfaces of said metal islands to render the surfaces electrically insulative and to insulate the islands from each other;

and filling the spaces between said islands with electrically conductive material to form a network of high electrical sheet resistance.

2. The invention according to claim 1, wherein said electrically conductive network has a thickness less than those of said metal islands.

3. The invention according to claim 1, wherein said oxidizable metal islands are formed by vacuum deposition.

4. The invention according to claim 3, wherein said oxidizable metal islands are formed by vacuum depositing a metal selected from the group consisting of lead and aluminum.

5. The invention according to claim 3, wherein said metal islands are formed by vacuum depositing an oxidizable metal on a substrate;

exposing the surfaces of said metal islands to oxygen;

and heating the substrate while said metal islands are exposed to said oxygen to form insulative metal oxide thereon.

6. The invention according to claim 5, wherein said substrate is heated at about 200° C.

7. The invention according to claim 1, wherein said metal islands and said electrically conductive network are formed by vacuum depositing films on a substrate.

8. The invention according to claim 7, wherein said electrically conductive network is deposited while said substrate is heated substantially above the ambient temperature, but below the melting point of said oxidized metal.

9. The invention according to claim 8, wherein said oxidized metal islands are formed by vacuum depositing a film of lead on said substrate;

and said electrically conductive network is deposited while said substrate is heated at about 300° C.

10. The invention according to claim 8, wherein said oxidized metal islands are formed by vacuum depositing a film of aluminum on said substrate;

and said electrically conductive network is deposited while said substrate is heated at about 500° C.

11. The invention according to claim 8, wherein said electrically conductive network is formed by vacuum depositing a material selected from the group consisting of chromium, and a mixture of chromium and silicon monoxide.

References Cited

UNITED STATES PATENTS

| | | | |
|---|---|---|---|
| 2,168,259 | 8/1939 | Gorlich | 117—210 |
| 2,244,365 | 6/1941 | Iams | 117—210 X |
| 2,296,616 | 9/1942 | Koller | 117—210 X |
| 2,434,931 | 1/1948 | Johnson | 117—210 |
| 2,588,019 | 3/1952 | Law | 117—210 X |
| 2,728,693 | 12/1955 | Cado | 117—212 |
| 2,745,772 | 5/1956 | Cassman | 117—217 X |
| 2,883,576 | 4/1959 | Harries. | |
| 2,976,188 | 3/1961 | Kohl | 117—217 X |
| 3,056,937 | 10/1962 | Pritikin | 29—155.7 X |
| 3,205,555 | 9/1965 | Balde et al. | 29—155.7 X |

CHARLIE T. MOON, *Primary Examiner.*

JOHN L. CLINE, *Assistant Examiner.*